United States Patent Office 3,462,125
Patented Aug. 19, 1969

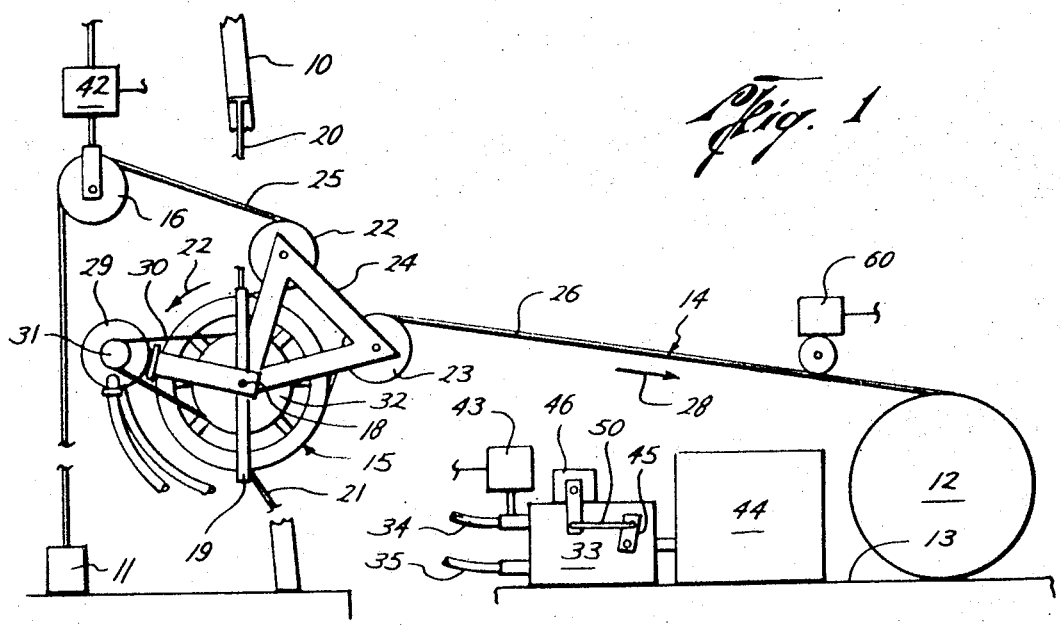

3,462,125
APPARATUS FOR HANDLING WELL TOOL CABLES
Lee H. Gollwitzer and William A. Whitfill, Jr., Houston, Tex., assignors to Schlumberger Technology Corporation, Houston, Tex., a corporation of Texas
Continuation of application Ser. No. 574,170, Aug. 22, 1966. This application Aug. 3, 1967, Ser. No. 658,092
Int. Cl. B66d 1/48, 1/76; F16d 31/00
U.S. Cl. 254—172                                15 Claims

ABSTRACT OF THE DISCLOSURE

The particular embodiments described herein as illustrative of one form of the invention are directed to cable-handling apparatus including a powered sheave assembly an opposing force will be applied to the cable to partially wrapped so that when power is applied to the sheave, an opposing force will be applied to the cable to partially offset tension forces acting thereon. Controls are provided to respond to the tension forces and speed of the cable for governing the rate of speed of the sheave as well as torque applied thereto.

---

The present application is a continuation of applicants' copending application Serial No. 574,170, filed Aug. 22, 1966, and now abandoned.

Accordingly, as will subsequently become apparent, the present invention pertains to apparatus for reducing the tension of a cable as it is spooled onto or off of a reel; and, more particularly, the present invention is directed to new and improved apparatus for regulating the tension of a cable wound on a drum to minimize damage that might otherwise result to either the cable or the drum from excessive cable tension.

The typical practice is to progressively spool the turns of a cable onto a drum in closely-spaced perfectly-circumferential, parallel paths except, of course, for a slight lateral offset or deviation at the end of each turn to allow the following turn to be laid immediately adjacent to the previous turn. Thus, far any particular layer of a properly wound cable, the offset portions will each be in the same direction and be uniformly aligned along the drum to give the appearance of a narrow longitudinal band. As the succeeding layer of cable is wound back across the drum, each turn thereof will be laid into the groove defined between two adjacent turns in the layer just below. Hereagain, a slight offset must also be made at the end of each of these turns. Since the layers are laid in successively alternating longitudinal directions, however, the offsets in each layer will be wound in the opposite direction so that each offset portion in the outer layer must cross two adjacent offset portions in the next lower layer.

Where so-called "wireline" tools are being employed in particularly deep wells, unusually high cable tensions in the order of 8–10,000 lbs. will be experienced at the drum of such cable-reeling equipment. In such instances, the actual strength of a cable as well as the hoisting capacity of its associated winch assembly can, of course, be selected for a particular duty. It has been found, however, that serious problems quite often arise in spooling of the cable onto and off of the winch drum under such high tensions. Moreover, where such high tension loads are carried by these cables, substantial inwardly-directed radial forces will be imposed uniformly around the circumference of each layer of cable onto the next layer immediately therebelow. Thus, at the above-described crossovers of the offset cable-portions, a substantial radial load may well be imposed on only a small surface area of the lower offset portions to induce considerable compressive loadings at these crossed portions which, in time, can cause permanent deformations and even failures at spaced intervals along the cable. The problem is, of course, even more acute where the cable has one or more electrical conductors within an elastomeric jacket.

It will be appreciated also that under typical field conditions, a cable should preferably be wound onto a drum with a tension that progressively decreases as the drum is filled. This is not always possible, of course, during typical field operations where the cable is reeled in and out many times during the course of even a single completion operation. Moreover, wide variations in tension will be experienced depending upon such factors as reeling speeds and whether the cable is being paid out or reeled in. Thus, after a prolonged completion operation, it is not at all uncommon to find that even adjacent groups of turns in the same layer are wound at different tensions.

Accordingly, it is an object of the present invention to provide new and improved devices for reducing the tension of a cable wound on a drum, with this reduction being accomplished in such a manner that a predetermined tension will be automatically applied to the various portions of the cable whether it is being reeled out or taken in.

This and other objects of the present invention are accomplished by arranging a selectively-operable powered drum or sheave between the winch assembly and the location in which a cable-suspension tool is to be used. By wrapping the cable at least part way around the powered sheave and driving the sheave in the direction that the cable is moving, the tension on that portion of the cable between the sheave and winch drum will be predeterminably less than the tension imposed on that portion of the cable between the suspended tool and the sheave. Means are further provided for controlling the power applied to or by the sheave to regulate the tension of the cable as it is taken-up or paid-out from the winch drum.

The novel features of the present invention are set forth with particularity in the appended claims. The operation, together with further objects and advantages thereof, may best be understood by way of illustration and example of certain embodiments when taken in conjunction with the accompanying drawings, in which:

FIGURE 1 depicts somewhat schematically a typical application of the present invention;

FIGURES 2A and 2B are graphic representations of typical conditions that may be experienced during the course of using the equipment shown in FIGURE 1; and FIGURE 3 shows control circuitry arranged in accordance with the present invention.

Turning now to FIGURE 1, a typical oil well is shown with a derrick 10 erected above a well head 11. A winch unit 12, such as may be mounted on a typical well-servicing truck 13, is stationed at a convenient location for observation of the well head 11. A cable 14 is extended from the winch unit 12 and passed around a powered sheave assembly 15 arranged in accordance with the present invention before entering the well head 11. As is typical, it is preferred to pass the cable 14 around a conventional idler pulley 16 dependently suspended from the derrick 10 directly over the well head 11 to direct the cable into the well head in substantially a vertical direction. A well tool (not shown) is, of course, supported on the lower end of the cable 14.

In general, the powered sheave assembly 15 is comprised of a sheave wheel 17 that is appropriately grooved around its periphery to partially receive the cable 14 and rotatably supported on an axle 18 journalled in a suitable suport member 19. To maintain the sheave assembly 15 in position to receive the cable 14, supporting members, such as chains 20 and 21 or the like, are used to suspend the assembly from the derrick 10 as well as secure it from upward movement. Moreover, once the sheave assembly 15 is in operation, the cable 14 will also be effective to hold the assembly in an operative position.

Although the cable 14 could be wrapped completely around the sheave wheel 17 for one or more turns, it is preferred to carry the cable only part way around the sheave wheel to maintain the entering and leaving cable portions in about the same vertical plane. To accomplish this, idler wheels 22 and 23 are appropriately aligned with the sheave wheel 17 and positioned on opposite sides thereof by a frame 24 movably supported on the axle 18. Thus, as shown in FIGURE 1, when the powered sheave assembly 15 of the present invention is in readiness for operation, the cable 14 will have been passed around a substantial circumferential portion of the sheave wheel 17, with one cable portion 25 leading over the idlers 16 and 22 to the well head 11 and the other cable portion 26 leading over the idler 23 to the winch unit 12.

It will be recognized, of course, that without applying rotative power to the sheave wheel 17, this wheel would act only as another idler pulley and the tension in the one cable portion 25 would be equal to the tension in the other cable portion 26. However, by appreciating the well-known capstan principle, it will be understood that by positively driving the sheave wheel 17 in the same direction (as shown by arrow 27) as the cable 14 is moving thereacross (as shown by arrow 28) toward the winch unit 12, the force (tension) applied on the cable portion 26 required to keep the cable moving will be predictably less than the tension that exists at that moment in the other cable portion 25. This relationship is best expressed as:

$$T_{25}/T_{26} = (e)^{\mu\theta} \qquad (Eq. 1)$$

where $T_{25}$ = tension in cable portion 25
$T_{26}$ = tension in cable portion 26
$e$ = Naperian constant
$\mu$ = coefficient of friction between the cable 14 and the sheave wheel 17
$\theta$ = total angular contact of the cable 14 with the sheave wheel 17 in radians It will be appreciated, therefore, that for any given physical arrangement of the powered sheave assembly 15, so long as the sheave wheel 17 can be maintained in frictional engagement with the cable 14 without relative slippage therebetween, the ratio of $T_{25}$ to $T_{26}$ can be regulated merely by varying the torque applied to the powered sheave 17. In another way of visualizing the fundamental principle involved here, it might be considered that the powered sheave 17 is gripping successive portions of the cable 14 (by virtue of its frictional engagement therewith) as it is being wound onto the winch unit 12 to relieve or take up part of the load (or tension $T_{25}$) on the cable portion 25 and thereby reduce the tension ($T_{26}$) on the cable portion 26 running to the winch unit 12.

To selectively power the sheave assembly 15, driving means, preferably a fluid-powered motor 29, are operatively connected to the sheave wheel 17 by appropriate transmission means as, for example, a roller chain 30 and sprockets 31 and 32. A fluid pump 33 is connected to the fluid motor 29 by appropriate pressure conduits 34 and 35 to complete the selectively-operable driving means of the present invention. It will be recognized, of course, that an electric motor could be used; but because of size considerations, fluid-powered devices using typical hydraulic fluids are more practical. Thus, with the arrangement as shown in FIGURE 1, it will be appreciated that as the cable 14 is being wound onto the winch unit 12 (in the direction of arrow 28), rotation of the sheave wheel 17 in the direction of arrow 27 will aid the winch unit and, thereby, reduce the tension ($T_{26}$) in the cable portion 26 with respect to the tension ($T_{25}$) in the other cable portion 25.

Before the control means 36 (FIGURE 3) for the present invention are described, the particular problems involved should be considered. Accordingly, turning now to FIGURE 2A, a representative graph is shown to illustrate a typical situation that may well be encountered during the use of the present invention. As depicted, the Y-axis or ordinate of the graph represents tension in pounds, with the X-axis or abscissa representing depth of a given well in feet. A straight inclined line 37 is plotted to represent a typical relationship of tension ($T_{25}$) developed at the surface of the ground for various lengths of the cable 14. It has been arbitrarily assumed that the horizontal line 38 is the maximum allowable tension to avoid damage to either the cable 14 or the drum of the winch unit 12. Thus, in view of the previously discussed considerations, the significant contribution of the powered sheave assembly 15 of the present invention is to assure that the cable 14 will be wound onto the drum of the winch unit 12 under a reasonable tension ($T_{26}$) that is less than the predetermined magnitude (the horizontal line 38).

One approach, therefore, would be to operate the powered sheave assembly 15 so as to always maintain the tension force $T_{26}$ at a constant differential less than $T_{25}$, as, for example, shown graphically by the lower inclined line 39 in FIGURE 2A. Examination of Equation 1 will show, of course, that to achieve this constant differential between $T_{25}$ and $T_{26}$, the ratio of these tensions ($T_{25}:T_{26}$) must increase as the cable 14 is progressively shortened. For example, at depth "A," $T_{25}:T_{26}$ will be only 1.5; but this ratio will increase to 2.0 at depth "B," and to 3.0 at depth "C." It has been found, however, that, as a practical limit, when the power applied to the motor 29 reaches a point where the ratio of $T_{25}:T_{26}$ exceeds about 2.0, slippage will occur between the sheave wheel 17 and cable 14. Once slippage begins, the coefficient of friction ($\mu$) will immediately be reduced and the ratio of the tension forces will approach unity.

An alternate approach, therefore, would be to operate the powered sheave assembly 15 so as to keep a constant differential between the tension forces over only short ranges and periodically decrease this constant differential at various points in the ascent of the cable 14. This would result in a range of tension forces $T_{26}$ as shown by the stepped line 40 in FIGURE 2A. In this manner, by periodically decreasing the desired differential, slippage between the cable 14 and sheave 17 can be avoided and successful operation of the invention achieved.

It will be recognized, however, that either of the two methods just described with reference to FIGURE 2A can require close attention of the winch operator. Moreover, since the coefficient of friction will vary depending upon the condition of the surface of the cable 14, slippage could still occur at unexpected moments particularly when the ratio of tension forces was already approaching their upper limit.

Accordingly, to insure more reliable operation, the preferred mode for operating the powered sheave assembly 15 of the present invention is to maintain the ratio of the tension forces $T_{25}$ and $T_{26}$ at a substantially constant value. In this manner, the tension force $T_{26}$ will follow a line such as represented at 41 in FIGURE 2B. It will be realized, therefore, that this mode of operation will decrease the differential between the tension forces $T_{25}$ and $T_{26}$ at a uniform rate in proportion to depth. This differential is, of course, proportional to the torque that is supplied to the sheave 17 by the driving motor 29.

The primary parameter from which control of the powered sheave assembly 15 is regulated must, of course, be the cable tension $T_{25}$. Representative control signals must be derived for regulating the hydraulic motor 29 so as to apply a torque to the sheave wheel 17 which, in turn, results in a cable tension $T_{26}$ having the desired ratio to tension $T_{25}$. Accordingly, as shown in FIGURE 1, in the preferred manner of obtaining such regulation, tension-sensing means are employed such as a typical strain gage 42 that provides electrical signals representative of tension forces and is arranged to support the idler pulley 16. For reasons that will subsequently become apparent, a typical potentiometric pressure transducer 43 responsive to differing fluid pressures is connected in the fluid conduit 34 interconnecting the hydraulic motor 29 and pump 33 to provide means for sensing the torque applied thereby to the powered sheave assembly 15.

It will be appreciated, therefore, that to maintain a constant ratio of $T_{25}:T_{26}$, the tension forces $T_{26}$ must vary directly in proportion to any variation of the tension forces $T_{25}$. Moreover, from the prior discussion, it will be recalled that the differential between the forces $T_{25}$ and $T_{26}$ is proportional to the amount of torque provided by the fluid motor 29; and this torque is, of course, directly related to the pressure of hydraulic fluid being supplied to the fluid motor by the pump 33. The fluid pressure sensed by the transducer 43 will, therefore, be representative of the differential in tension forces, $T_{25}-T_{26}$. It will also be realized that the fluid motor must be run at whatever speed is necessary to maintain the peripheral speed of the driving sheave 17 at the same velocity as the cable 14. Speed of the motor 29 is, of course, directly related to the rate at which fluid is supplied to the motor.

Accordingly, to vary the flow rate of fluid supplied to the fluid motor 29 in a controlled manner over a sufficiently wide range, the fluid pump 33 is preferably a constant-displacement pump whose output flow rate can be regulated in a predictable manner over a desired range. In the preferred embodimenet of the present invention, therefore, the pump 33 is a variable-stroke reciprocating piston pump that will maintain a subtantially constant delivery rate at any given stroke setting, with the pump including means for predictably regulating the length of the stroke over a wide range to produce a correspondingly wide range of proportionally varying output flow rates to power the fluid motor 29. The pump 33 is run at a constant speed by either the truck engine or a separate engine, as at 44, mounted in some convenient location as, for example, on the truck 13.

In the preferred embodiment of the present invention, the pump 33 and motor 29 are a combined unit such as a Dynapower Model 45 unit as manufactured by the Hydreco Division of the New York Brake Company and shown in their Application Engineering Manual DP-10.2 of June 25, 1964, that has a pivoted external lever 45 suitably arranged to regulate in a predictable manner the stroke and, therefore, the displacement or output flow rate of the pump. To position the lever 45, a servomotor 46 is provided with an output shaft gear 47 (shown schematically in FIGURE 3) that is operatively engaged with a sector gear 48 on one end of a pivotally mounted arm 49 and which has its opposite end connected by a link 50 to the lever 45. Thus, as the input signal to the servomotor 46 is varied, the lever 45 will be moved to a corresponding position to provide a proportionally-related output flow rate from the pump 33 to develop a corresponding output from the fluid motor 29.

Accordingly, as best seen in FIGURE 3, a somewhat simplified, but representative, schematic diagram is shown of a preferred embodiment of the control circuitry 36 employed in the present invention. In general, the control circuitry 36 is arranged to control the operation of the fluid motor 29 so as to develop a desired torque as well as to maintain the peripheral speed of the sheave 17 equal to the speed of the cable 14 when it is moving. To accomplish this control of the fluid motor 29, the servomotor 46 is employed to regulate the displacement control lever 45 in accordance with DC control signals $V_s$ and $V_t$ respectively corresponding to the tension $T_{25}$ and the speed of the cable 14 which are the two independent variables of the system. Secondary or feedback signals $V_p$ and $V_c$ respectively corresponding to the output pressure of the pump 33 and the relative position of the displacement control lever 45 are developed to provide an accurate control of the servomotor 46.

These various control signals are combined in a voltage-summing or "adder" network 51 to provide a composite DC output signal for controlling the servomotor 46. Since it is, of course, preferable to amplify AC rather than DC signals, this composite output signal is first converted to AC by a so-called "chopper" 52 before passing through an AC amplifier 53 to the control windings of the servomotor 46.

To make the explanation of the control circuitry 36 easier to understand, let it first be assumed that the primary signal $V_t$ (representative of the speed of the cable 14) and its correlative signal $V_s$ (representative of the position of the displacement control lever 45) are in balance and not affecting the circuit. It is believed that the part these signals play in the present invention will be better understood by first explaining the function of the primary signal $V_s$ (representative of tension $T_{25}$) and its counter-part $V_p$ (representative of the output pressure of the pump 33 and, therefore, of the torque developed by the fluid motor 29).

Accordingly, to derive a signal representative of the cable tension $T_{25}$, the strain gage 42 is connected to a so-called "signal conditioner" 54 which provides an output signal $V_s$ that varies in magnitude in response to changes in the cable tension $T_{25}$. The output terminals of the signal conditioner 54 are connected across a manually-adjustable potentiometer 55 which has its movable contact 56 connected to the adder 51. For the moment, however, assume that the movable contact 56 is appropriately positioned to permit a maximum $V_s$ signal to be introduced to the adder 51. The effects of adjusting the potentiometer 55 will be subsequently explained.

The pressure transducer 43 is similarly connected to the adder 51 by means of a signal conditioner 57 so arranged that increases in the fluid pressure in the conduit 34 will provide an output signal $V_p$ that will oppose the primary signal $V_s$ and produce a zero output signal $V_o$ from the amplifier 53 to halt the servomotor 46 whenever the fluid motor 29 is developing a torque having the desired relation to the particular tension force $T_{25}$ then being sensed by the strain gage 42. Thus, assuming everything else being equal, when a particular tension force $T_{25}$ is imposed on the strain gage 42, the amplifier 53 will provide an output signal $V_o$ that will drive the servomotor 46 and start moving the control lever 45 until the $V_p$ signal from the pressure transducer 43 reaches a value sufficient to produce a zero output signal $V_o$ at a position of the lever that will maintain a desired torque on the fluid motor 29 at whatever speed it may be running. In this manner, once the output pressure of the fluid pump 33 reaches a value sufficient to develop a predetermined torque in response to a given tension force $T_{25}$, the servomotor 46 will be stopped to leave the control lever 45 in whatever position it is in at that time.

It is, of course, recognized that because of inherent lags between the introduction of a control signal, such as $V_s$, and the response of the device controlled thereby, a servo system such as disclosed herein will usually cycle or "hunt" as a result of overcontrolling the servomotor 46. Accordingly, to signal the arrival of the control lever 45 at a desired position before the output pressure of the fluid pump 33 reaches a desired value, position-sensing means, such as a potentiometer 58, are connected to the control lever 45 or pivoted arm 49 to provide a varying signal $V_c$ indicative of the relative positions of the control lever. This potentiometer 58 is similarly connected to the adder 51 by way of a signal conditioner 59 to provide a suitable signal $V_c$. Thus, by receiving a $V_c$ signal designating that the control lever 45 has already reached a desired position and a particular flow rate is provided, the output signal $V_o$ of the amplifier 53 will reach a zero point before the pressure transducer 43 will have had time to sense the slightly lagging fluid pressure in the conduit 34. The added anticipatory $V_c$ signal will, therefore, provide an added feedback signal which makes operation of the present invention much more reliable and smoother.

The combination of these two feedback signals $V_p$ and $V_c$ will, however, add an erroneous factor into the control of the servomotor 46. Since it is necessary that $V_p$ bear a known relation to $V_s$ to develop an output torque from the fluid motor 29 that is directly related a particular tension force $T_{25}$, it will be seen that the $V_c$ signal will inject a somewhat unrelated factor into the problem. It should be recognized, however, that $V_c$ is directly related to the position of the control lever 45 which, of course, directly governs the output flow rate from the fluid pump 33. Thus, it will be appreciated that $V_c$ is directly related to the speed of the sheave 17 since it is the output flow rate of the pump 33 that determines the speed at which the sheave is rotated. Accordingly, by developing an opposing signal that is also related to speed of the sheave 17, it will be seen that once the displacement control lever 45 has reached a desired position, the $V_c$ signal can be cancelled to leave $V_p$ as the sole factor opposing $V_s$ to provide an accurate regulation of torque in relation to the cable tension $T_{25}$.

Accordingly, to provide such an opposing signal as well as to accommodate the other primary independent variable of the system (i.e., cable speed) cable speed sensing means such as a tachometer 60, are operatively arranged to engage the cable 14 at a convenient location to measure its speed. By connecting the tachometer 60 by way of a suitable signal conditioner 61 to the adder 51, a signal $V_t$ will be produced which is designed to equal but oppose $V_c$ whenever the displacement control lever 45 is in a position to provide an output flow rate from the pump 33 that is sufficient to drive the sheave 17 at a peripheral speed equal to the linear speed of the cable 14.

It will be seen, therefore, that all four of the signals $V_s$, $V_p$, $V_t$ and $V_c$ will cooperate so that once their summation produces a zero output signal $V_o$ from the amplifier 53, the servomotor 46 will be halted to leave the displacement control lever 45 in just the right position to maintain the output pressure and flow rate of the pump 33 such that the desired torque and peripheral speed of the sheave 17 will produce the sought-after restraint on the cable 14 to reduce the tension force $T_{26}$ to a desired magnitude.

A change in tension on the cable portion 25 will, for example, unbalance the servo system and produce an output signal $V_o$ which will begin repositioning the control lever 45. Once the lever 45 reaches a desired position, $V_c$ will assist in opposing $V_s$ to keep the servomotor 46 from overshooting. Then balance of the system will be restored once the output pressure comes to a magnitude to provide a $V_p$ signal that completely opposes the $V_s$ signal. A change in cable speed will accomplish a similar result.

It will be appreciated that it may be desired to adjust the ratio of the tension forces $T_{25}$ and $T_{26}$. So long as the potentiometer 55 is at a maximum position, a $V_s$ signal from the strain gage 42 will also be at its maximum and a correspondingly maximum torque will be applied to the sheave 17. A maximum restraint of the cable 14 will, of course, produce a maximum differential between the tension forces $T_{25}$ and $T_{26}$. Thus, to reduce the differential between the tension forces $T_{25}$ and $T_{26}$, it is necessary only to move the sliding contact 56 to some intermediate position on the potentiometer 55. Once this is done, the $V_s$ signal will be proportionally lessened and a correspondingly lower $V_p$ signal will be obtained to produce equivalently lower torques on the sheave 17. The $V_t$ and $V_c$ signals being of equal but opposite magnitudes when all else is adjusted will, of course, not affect the operation.

In a similar fashion, it will also be realized that to produce a constant differential between the tension forces $T_{25}$ and $T_{26}$ (as shown by the line 39 in FIGURE 2A for example), it is necessary only to remove the $V_s$ signal and substitute instead a fixed voltage. Accordingly, as seen in FIGURE 3, a double-throw single-pole switch 62 may be used to disconnect the potentiometer 55 from the adder 51 and instead connect the adder to a constant voltage DC source as, for example, a battery 63. Thus, in this manner, a constant differential can be maintained between tension forces $T_{25}$ and $T_{26}$ so long as slippage does not occur between the cable 14 and the sheave 17. A varying range of these constant differentials of tension forces can, of course, be obtained by shunting a potentiometer 64 across the battery 63.

It will be appreciated that although the preceding description has pertained to operation while the cable 14 is being reeled in, the present invention will be equally effective while the cable is either halted or is being unreeled. For example, if the cable 14 is halted, $V_t$ will, of course, be zero (or maximum). Thus, since no displacement of the pump 33 is required to maintain flow, $V_c$ will also be zero (or maximum) to equalize the relation between it and $V_t$. Thus, since the tension force $T_{25}$ will remain constant so long as the cable 14 is stopped, both of the $V_s$ and $V_p$ signals will be equal and at a magnitude sufficient to develop the desired torque on the sheave 17 to provide the desired restraining force on the cable.

On the other hand, when the cable 14 is being unreeled, it will be appreciated that the fluid pump 33 will act as a brake to restrain the fluid motor 29 which will now be driven by movement of the cable 14 over the sheave 17. The various controls will still function as described, with the displacement control lever 45 being moved by the servomotor 46 to a position where the fluid pump 33 will be stroked sufficiently to provide the braking action.

Accordingly, it will be appreciated that the present invention has provided means for automatically reducing the tension imposed on a cable as it is being reeled onto or off of a winch drum. By reducing the tension of the cable as it is wound onto a drum, damage to the cable and its drum which has heretofore been unavoidable will be eliminated. Moreover, by employing the present invention, a cable may be wound onto a drum with a predetermined tension that will allow it to be unreeled later in a consistent manner that will preclude unexpected jerks of a well tool as it is lowered into a well bore to eliminate relative movement of the cable relative to its drum and resulting damage to the tool or cable.

While particular embodiments of the present invention have been shown and described, it is apparent that changes and modifications may be made without departing from this invention in its broader aspects.

What is claimed is:

1. Cable-handling apparatus comprising: a suspension cable; a reel carrying said cable; cable-pulling means gripping an intermediate portion of said cable extended from said reel to a remote location for transmitting forces to said cable; motive means coupled to said cable-pulling means and operative over a range of operating conditions sufficient to transmit forces through said cable-pulling means to said cable for opposing tension forces acting thereon; first control means coupled to said motive means and responsive to first predetermined conditions for operating said motive means at predetermined points in said operating range calculated to develop and apply corresponding opposing forces to said intermediate cable portion; and second control means coupled to said first control means and responsive to second predetermined conditions acting on sand intermediate cable portion for maintaining said motive means at corresponding operating points.

2. The apparatus of claim 1 wherein said first predetermined conditions are tension forces acting on said cable from such a remote location and said second predetermined conditions are related to the magnitude of opposing forces developed on said intermediate cable portion by said motive means.

3. The apparatus of claim 2 wherein said first and second predetermined conditions are so related to one another as to produce opposing forces less than such tension forces and changing at a rate less than the rate of change of such tension forces.

4. The apparatus of claim 1 further including: third control means coupled to said first control means and responsive to a condition related to the rate of travel of said cable for providing a first signal anticipating complete responsive to said first control means to said first predetermined conditions; and fourth control means coupled to said first control means and responsive to another condition related to the rate of travel of said cable for providing a second signal for cancelling said first signal whenever said first control means have completely responded to said first predetermined conditions.

5. Cable-handling apparatus comprising: a reel; a sheave member adapted to be supported at a location spaced from said reel; a suspension cable spooled on said reel for movement thereby to and from a remote location, said cable being operatively extended from said reel and operatively engaged with at least a portion of the periphery of said sheave; a fluid-powered motor coupled to said sheave for applying rotative torque thereto; fluid-pumping means coupled to said fluid motor and including selectively-operable means for varying the displacement of said fluid-pumping means, first control means coupled to said displacement-varying means and responsive to first predetermined conditions for regulating said displacement-varying means to develop a corresponding torque on said sheave; and second control means coupled to said first control means and responsive to second predetermined conditions indicative of forces applied on said cable by said sheave for maintaining said displacement-varying means at a corresponding operating point.

6. The apparatus of claim 5 wherein said second control means include means responsive to the output fluid pressures developed by said fluid-pumping means for providing corresponding control signals.

7. The apparatus of claim 5 wherein said first control means include means for applying a predetermined signal to said displacement-varying means for obtaining a corresponding predetermined displacement rate from said fluid-pumping means.

8. The apparatus of claim 5 wherein said first control means include means responsive to tension forces on said cable for providing corresponding control signals; and said second control means include means responsive to the output fluid pressures developed by said fluid-pumping means for providing corresponding control signals.

9. The apparatus of claim 5 further including: third control means coupled to said first control means and responsive to operation of said displacement-varying means for providing corresponding control signal anticipating complete response to said first control means to said first predetermined conditions; and fourth control means coupled to said first control means and responsive to the travel of said cable for providing corresponding control signals for cancelling the control signals from said third control means whenever said first control means have completely responded to said first predetermined conditions.

10. The apparatus of claim 5 wherein said first control means include a servomotor operatively connected to said displacement-varying means for positioning said displacement-varying means over a predetermined range, circuit means for controlling said servomotor in accordance with input signals applied to said circuit means, and means responsive to first predetermined conditions for providing corresponding input signals to said circuit means; and said second control means include means responsive to output fluid pressures of said fluid-pumping means for providing corresponding feedback signals to said circuit means.

11. The apparatus of claim 10 wherein said first predetermined conditions are tension forces acting on said cable and said condition-responsive means are responsive to such tension forces for providing corresponding input signals to said circuit means.

12. The apparatus of claim 10 wherein said condition-responsive means include means for providing a constant input signal to said circuit means.

13. The apparatus of claim 10 further including: third control means responsive to the positions of said displacement-varying means for providing corresponding input signals to said circuit means anticipating the complete response to said first predetermined conditions as indicated by said second control means; and fourth control means responsive to the speed of travel of said cable for providing corresponding feedback signals to said circuit means cancelling said control signals from said third control means whenever said second control means have indicated a complete response to said first predetermined conditions.

14. Cable-handling apparatus adapted for use with a cable having first and second oppositely-directed tension forces respectively acting on first and second spaced portions thereof and comprising: a rotatable cable sheave adapted to frictionally engage an intermediate portion of such a cable for transmitting pulling forces thereto; selectively-operable driving means coupled to said cable sheave and including torque-regulating means selectively variable for rotating said cable sheave over a predetermined range of torques to transmit respectively-corresponding pulling forces to such a cable for partially opposing said first tension forces and correspondingly reducing said second tension forces; first control means coupled to said torque-regulating means and responsive to said first tension forces for progressively varying said torque-regulating means in accordance with changes in said first tension forces to drive said cable sheave at torques proportionally related to said first tension forces; and second control means coupled from said driving means to said torque-regulating means and responsive to the torques driving said cable sheave for progressively varying said torque-regulating means in accordance with said driving torques.

15. The cable-handling apparatus of claim 14 further including: third control means coupled to said torque-regulating means and responsive to a condition related to the rate of travel of such a cable for varying said torque-regulating means in anticipation of complete response of said first control means to said first tension forces; and fourth control means coupled to said torque-regulating means and responsive to another condition related to the rate of travel of such a cable for offsetting said third control means whenever said first control means have completely responded to said first tension forces.

References Cited

UNITED STATES PATENTS

| 2,609,181 | 10/1952 | Jaeschke | 254—172 |
| 3,093,946 | 6/1963 | Pitt | 60—53 |
| 3,225,542 | 12/1965 | Hansen | 60—53 |
| 3,300,187 | 1/1967 | Saxe | 254—172 |

EVON C. BLUNK, Primary Examiner

HARVEY C. HORNSBY, Assistant Examiner

U.S. Cl. X.R.

60—53; 254—175.7

20.1657

UNITED STATES PATENT OFFICE
CERTIFICATE OF CORRECTION

Patent No. 3,462,125      Dated August 19, 1969

Inventor(s) Lee H. Gollwitzer and William A. Whitfill

It is certified that error appears in the above-identified patent and that said Letters Patent are hereby corrected as shown below:

Column 1, line 16 (application Page 1, line 12)
following "assembly" insert -- around which a suspension cable is at least partially wrapped so that when power is applied to the sheave, --;

Column 1, lines 18-19 (application Page 1, line 13)
delete "wrapped so that when power is applied to the sheave, an opposing force will be applied to the cable to partially";

Column 1, line 42 (application Page 2, line 12)
"far" should read -- for --.

Column 2, line 71 (application Page 5, line 26)
"suport" should read -- support --.

Column 6, line 18 (application Page 14, line 4)
"$V_s$" should read -- $V_c$ --.

Column 8, line 70 (application Claim 1, line 14)
"sand" should read -- said --.

Column 9, line 30 (application Claim 5, line 10)
"," (comma) should read -- ; -- (semicolon).

(SEAL)
Attest:

NOV 3 1970

Edward M. Fletcher, Jr.
Attesting Officer

WILLIAM E. SCHUYLER, JR.
Commissioner of Patents